Jan. 12, 1932.  A. G. RAYBURN  1,840,874

FLUID OPERATED POWER TRANSMISSION

Filed April 28, 1927    4 Sheets-Sheet 2

Inventor
Alden G. Rayburn
William A. Strauch
By
Attorney

Patented Jan. 12, 1932

1,840,874

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

FLUID OPERATED POWER TRANSMISSION

Application filed April 28, 1927. Serial No. 187,317.

The present invention relates to power transmissions and more particularly to torque multiplying and speed driving fluid operated power transmissions.

In prior hydraulic transmissions embodying reciprocating piston pumps, at higher speeds of operation, the rapid reciprocation of the fluid in the pump causes rapid agitation tending to whip entrained air into the fluid or oil utilized tending to create so-called emulsification of the fluid which destroys the effectiveness of the mechanism. Because of the tendency towards foaming, it has been the practice to surround the pump and motor units of hydraulic transmissions with fluid to prevent, so far as possible, entry of air into the fluid circulating system during operation. Surrounding the mechanisms with fluid is subject to the disadvantage of decreased overall efficiencies. By providing a system open to atmosphere on the suction side in hydraulic transmissions, I have been able to eliminate the necessity of surrounding the pump and motor units with fluid, and have been able to increase the feasible speed of operation of reciprocating types of piston pump mechanisms to permit successful operation for the transmission of power from relatively high speed internal combustion engines of the Diesel type. As the speeds of operation are increased even though foaming and emulsification of the fluid is substantially avoided in my open type system, a point is reached where the inertia of the reciprocating fluid is such that the pump will not pick it up and the mechanism fails to transmit power effectively.

Because of the inherent disadvantages of hydraulic transmissions using reciprocating piston pumps and motors, efforts have been made to provide hydraulic transmissions with rotary pumps and motors. All of such proposed rotary constructions have been subject to excessive losses caused by deflection of parts under pressure and due to excessive running clearances necessary to permit expansion of the rotating parts in operation of the device, as the temperatures vary. The prior proposed rotary pump constructions have also been largely of complicated and commercially impractical nature. Because of the mechanical complications and difficulties involved in the prior proposed constructions, the rotary type of hydraulic transmission has not met with any substantial commercial success.

Accordingly, an object of the present invention is to provide hydraulic transmissions utilizing pumps of the rotary type in which minimum substantially uniform mechanical clearances are maintained, and maximum efficiencies of operation are secured throughout the operating temperatures and pressures.

A further defect of prior proposed hydraulic transmissions has been due to the fact that the mechanical arrangements have been such as to necessitate the utilization of fluid passes and valves which do not compensate for wear and must be packed against leakage of fluid under high pressures. These packings are expensive to maintain, and transmissions of this type when placed in vehicles must be frequently withdrawn from service for repairs. Another object of the present invention is to provide a hydraulic torque multiplying power transmission in which no high pressure packings are required.

A further defect of prior hydraulic transmissions has been due to the fact that the constructions have been such that special grades of oil have been necessary, necessitating special attention in maintenance which is undesirable. Accordingly, another object of the present invention is to provide hydraulic transmission arrangements in combination with internal combustion engines, in which the operating fluid for the transmission is the same as is used in the crank case of the engine for lubricating purposes, and the mechanisms are so combined with the engine that the leakage from the transmission drains into the engine crank case and fluid is fed to the transmission while the engine operates for the purpose of lubricating the transmission parts and maintaining a proper supply of fluid in the transmission at all times. This arrangement requires a minimum of attention on the part of the operator, and is especially adapted to meet the demands of modern motor vehicle operation for the reason that so long as the level of oil is maintained in the engine, the proper amount of operating fluid will be maintained in the transmission.

I have discovered in a hydraulic transmission of the differential type that if the fluid is continuously passed through the pumping unit in a single direction without reversing the direction of flow thereof, a reciprocating piston type motor may be utilized for substantially increased speeds of operation. Accordingly, a further object of my invention is to provide a novel transmission of the differential type in which a rotary type pump and a reciprocating piston type motor are utilized; preferably in which the mechanical motor driving reactions are balanced against the fluid pressure pump reactions so that the only unbalanced forces of the operating parts of the mechanism are in a direction tending to produce rotation of the driven member, eliminating the necessity for special thrust bearing arrangements to resist the longitudinal motor and pump thrust reactions, and in which the rotating valve and pump parts are held in sealing engagement at all times, while permitting expansion and contraction due to operating temperature variations without causing binding of the parts or excessive leakage to occur.

Still further objects of my invention are to provide simplified hydraulic transmissions in which the resistance to flow of the fluid is reduced to a minimum which are adaptable for transmission of relatively higher powers and relatively high speed operation with higher efficiencies than have been heretofore attainable; to provide novel pump and motor constructions and principles of operation applicable for hydraulic transmissions of the differential and other types and are adapted for use in various other relations; and to provide novel methods of controlling variable motors useful in the relations hereinafter set forth and independently thereof.

Further objects of the invention are such as may be attained by a utilization of the various combinations, subcombinations and principles, hereinafter set forth in the various relations to which they may be adapted without departing from the spirit of my invention, as set forth more particularly in the following detailed disclosure of the preferred embodiments and in the terms of the appended claims.

As shown in the drawings—

Figure 10 is a transverse sectional view taken along line X—X of Figure 1.

Figure 1:
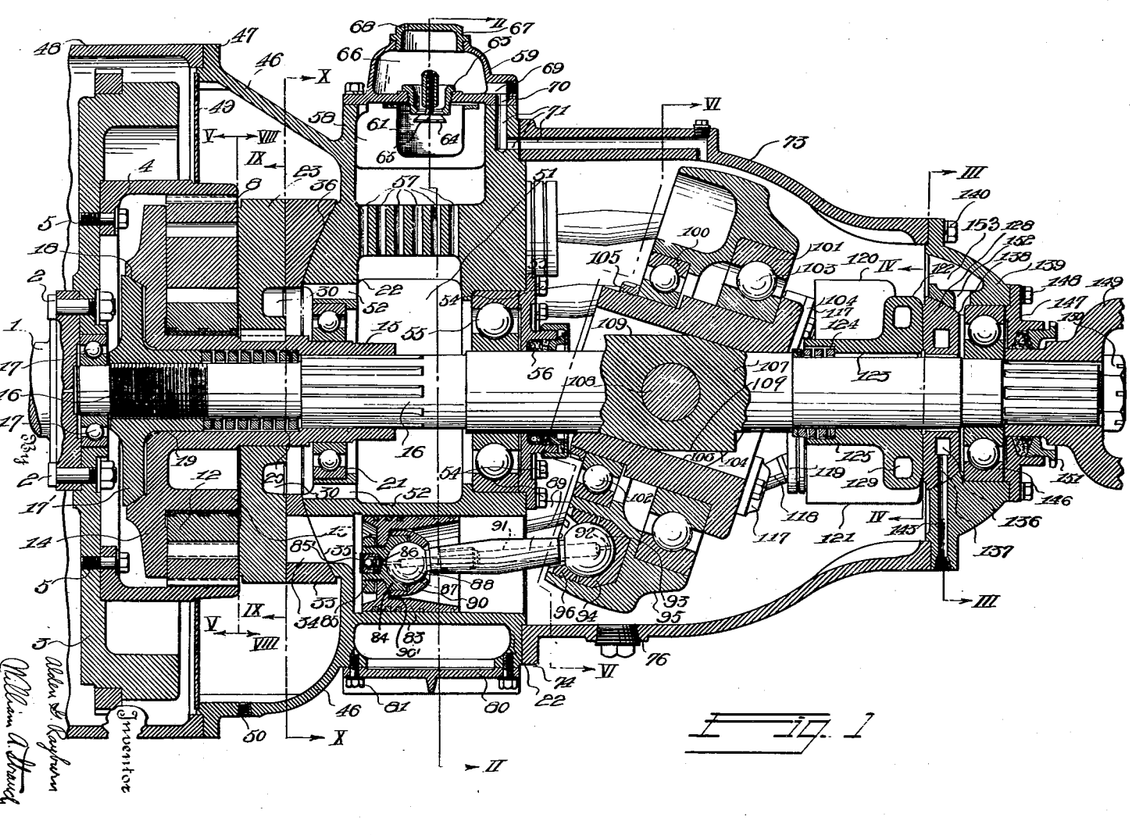
Figure 1 is a sectional side elevation of a preferred embodiment of the invention.
Figures 5, 6, 7:
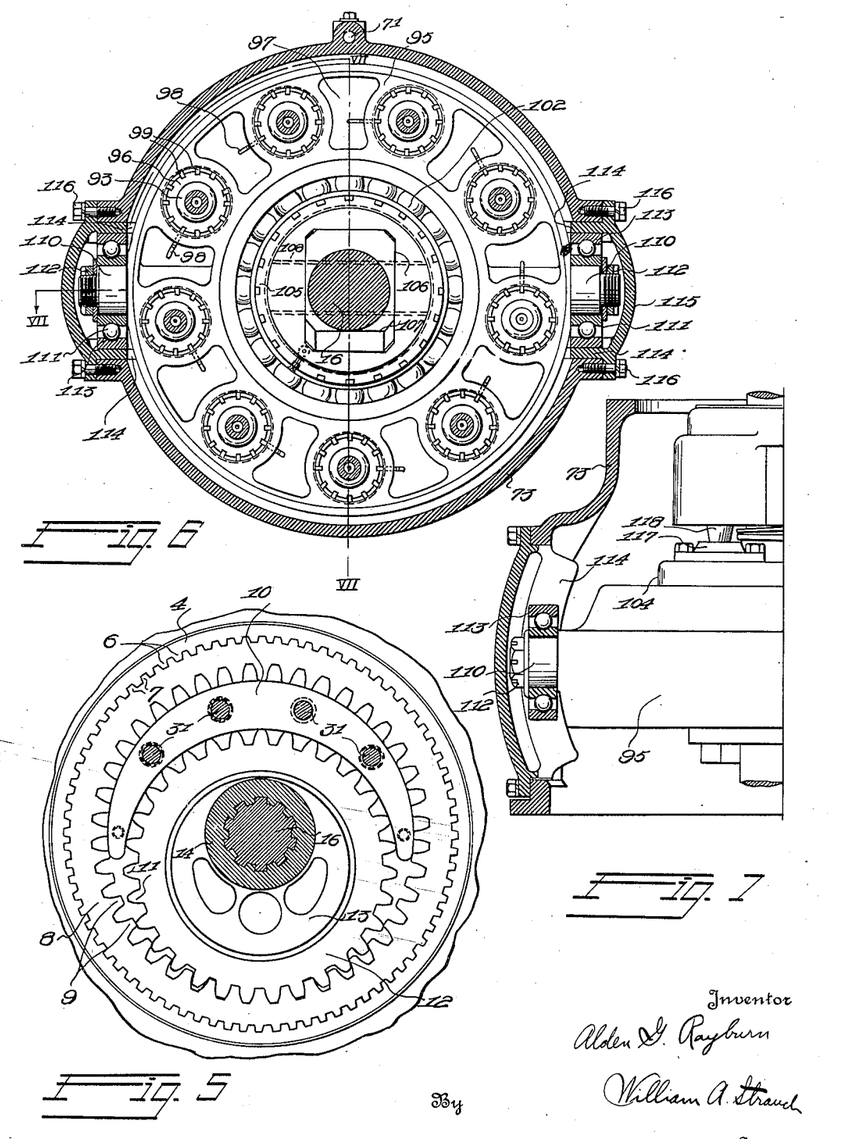
Figure 5 is a transverse sectional view taken along line V—V of Figure 1.
Figure 6 is a transverse sectional view taken along line VI—VI of Figure 1.
Figure 7 is a half sectional view taken along line VII—VII of Figure 6.

As shown in Figure 1, connected to a shaft 1 of a suitable prime mover, such for example, as a gasoline or internal combustion engine, by means of the securing bolts 2, is a flywheel 3 to which the end flange of a cylindrical drive member 4 is secured by means of the studs 5. Formed in the drive member 4 are internal series of driving teeth or splines 6 which mesh with the teeth or splines 7 (Figure 5) of pump ring gear 8. Gear 8 is provided with internal gear teeth 9, the inner surfaces of which are adapted to rotate in fluid sealing engagement with the outer surface of sealing segment 10 and which mesh with the teeth 11 of a pump pinion 12 opposite the center of segment 10. The tops or outer surfaces of pinion teeth 11 are adapted to rotate in fluid sealing engagement past the inner surface of sealing segment 10. Pinion 12 is journaled on eccentric 13 which is formed integrally with the pump side wall member 14 which is also provided with a central tubular quill section 15 formed integrally therewith. Quill 15 is slidably splined to driven or tail shaft section 16 which at its forward end is journaled in pilot bearing 17 of flywheel 3. Threaded on the end of shaft section 16 is a thrust collar 17′ provided with a frustro-conical surface 18 which bears against a complemental recess formed in pump side wall member 14 holding the side wall in engagement with gear 8, sealing segment 10 and pinion 12 in operation of the device as will more fully hereinafter appear. Thrust collar 17′ is provided with a tubular extension 19 which fits slidably into a bore formed in the quill 15. Surrounding shaft 16 and interposed between the end of tubular extension 19 and the ends of splines formed in the end of quill 15 is a helical compression spring 20, normally under compression to force the quill 15 together with the pump side wall 14 to the right in Figure 1 with relation to shaft 16. The splined section of quill 15 is supported in a ball or anti-friction bearing 21 which is mounted in a central bore formed in a stationary motor cylinder block and supporting casting 22.

Figure 8:
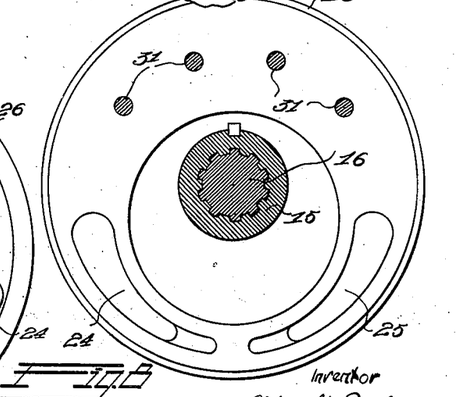
Figure 8 is a transverse sectional view taken along line VIII—VIII of Figure 1.
Figure 9:
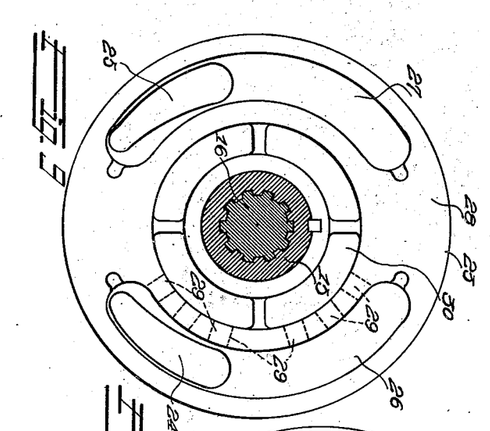
Figure 9 is a transverse sectional view taken along line IX—IX of Figure 1.
Figure 11:
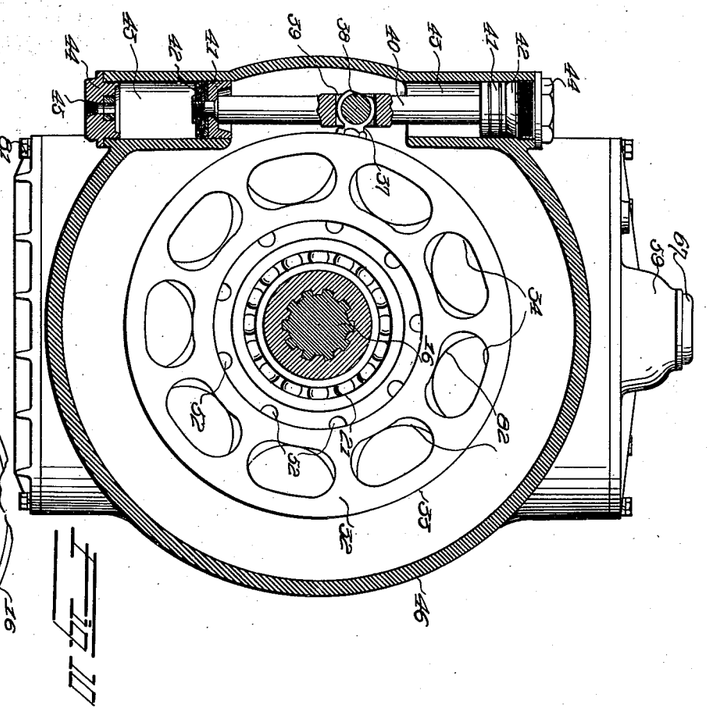

Slidably keyed on quill 15 is a pump end wall and fluid distributing plate 23 against the inner surface of which gear 8, segment 10, and pinion 12 abut and in which suction and discharge ports 24 and 25 (Figures 8 and 9) are formed. Ports 24 and 25 connect with distributing ports 26 and 27 respectively, formed in the timing face 28 of the plate 23, and fluid inlet ports 29 connect suction port 26 with the central fluid storage space 30 formed in plate 23. Fitting into suitable holes formed in sealing segment 10 are the dowel pins 31 which are secured in plate 23 and support sealing segment 10, holding segment 10 in fixed relation to eccentric 13 in operation of the mechanism.

Face 28 of plate 23 is held in fluid sealing engagement with the valve face 32 (Figure 10) of clutch plate 33. Formed in clutch plate 33 are fluid ports 34 which are adapted to successively and alternately communicate with the distributing ports 26 and 27 of plate 23. Formed in the clutch plate 33 is a concave spherical recess seating and aligning surface 35 (Figure 1) which fits rotatably on a complemental convex spherical seating surface 36 of cylinder block 22.

Secured to the periphery of clutch plate 33 is an actuating extension 37 provided with a flat sided section 38 having spherical surfaced ends which fits into a central actuating slot 39 of an actuating rod 40.

Slot 39 is slightly greater in width than the distance between the flat sides of actuating member 38 and the ends of the slot engage the spherical surfaces of the actuating member 38 so that in operation of the device, a universal seating movement of clutch plate 33 on the seating surface 36 is permitted, and the rotation of clutch plate 33 is controlled by the position of the rod 40. Secured to opposite ends of the actuating rod 40 are the pistons 41 and fluid packing members 42 which fit slidably into the actuating cylinders 43. The ends of cylinders 43 are closed by the plugs or caps 44 in which threaded connections 45 for fluid pipes are provided to admit fluid into the cylinders 43 for the purpose of shifting clutch plate 33. Cylinders 43 are formed in forward casing section 46 (Figure 1) formed integrally with the cylinder block or central casting 22. Formed on the casing section 46 is a securing flange 47 which is secured by suitable studs or cap screws to the bell housing or casing section 48 of the prime mover. Secured to flange 47 is an annular dividing plate 49 through a central bore of which the coupling member 4 extends, thereby forming a partition between the interior of casing section 46 and the engine bell housing or casing 48 to prevent the passage of fluid from the transmission casing section 46 into the bell housing. Formed in the bottom of casing section 46 is a threaded pipe connection 50 through which the fluid accumulating in casing section 46 may pass into suitable pipes and be led to the crank case of the engine or to the suction side of a circulating pump (not shown) to be returned to the transmission after filtration and rectification.

Figure 2:
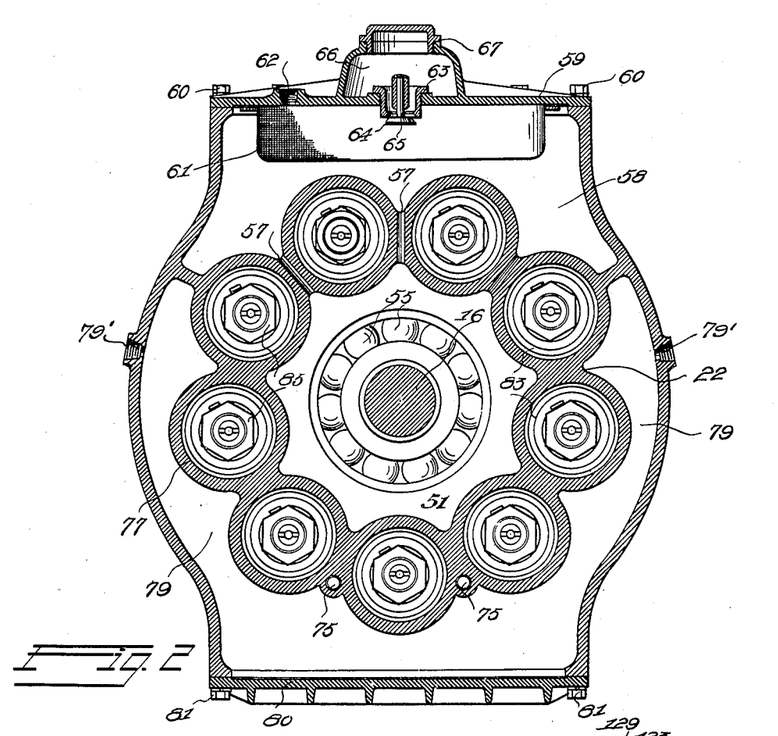
Figure 2 is a sectional view taken along line II—II of Figure 1.

Formed centrally in casting 22 is a fluid storage space 51 which is connected by conduits 52 to a central fluid storage space formed in clutch plate 33 which communicates with the fluid feeding space 30 formed in valve plate 23. The rearward end of the fluid storage space 51 is closed by a cap 53 which is secured to cylinder block 22 by means of studs or cap screws 54, and holds an anti-friction bearing 55 supporting tail shaft 16 in position in the end of the cylinder block. A suitable low pressure packing gland structure 56 secured in cap 53 prevents loss of fluid from the central storage space 51 as well as substantially preventing air from being drawn from the rear casing into the fluid space and the fluid in space 51 lubricates bearing 55. Formed in cylinder block 22 are a plurality of fluid ducts 57 which establish communication between central storage space 51 and a fluid reservoir or storage chamber 58 formed in the top of casting 22. A cover plate 59 (Figures 1 and 2) secured in position by cap screws 60 closes the top of storage space 59. Secured to cover plate 59 is a filter screen 61 to which the fluid for the transmission is fed through a pipe connection 62 from the by-pass connection of the engine pump or from the circulating pump. Secured centrally in cap 59 (Figures 1 and 2) is a check valve seat 63 provided with a check valve 64 normally held in the open position by the action of gravity. Formed centrally through the valve 64 is an air and gas escape duct 65 through which air and gases may escape from the space 58 into chamber 66 when a sudden surge of fluid closes the check valve 64 in operation of the mechanism, as will more fully hereinafter appear. Instead of a check valve a labyrinth check arrangement may be provided to prevent loss of fluid due to sudden surges. The top of chamber 66 is closed by the threaded filling plug 67 in which a small air outlet opening 68 is formed to permit the escape of air and gases to atmosphere. Fluid ducts 69 and 70 formed in cap 59 connect with a lubricating duct 71 formed in casting 22 and rear transmission casing section 73 which is provided with a flange 74 secured by suitable cap screws to casting 22.

Formed in the lower part of the cylinder block 22 are fluid passages or ducts 75 which connect the interiors of casing sections 46 and 73 so that fluid accumulating and rising above a predetermined level in the bottom of the casing section 73 will drain into the casing section 46. Located in the bottom of casing section 73 is a drain plug 76 through which any accumulated fluid in casing section 73 may be drained if desired.

Formed in cylinder block 22 (Figures 1 and 2) are parallel motor cylinders 77 preferably odd in number, equally spaced, and annularly arranged in the cylinder block. As shown the axis of the lowest cylinder and the central ducts 57 are located in the central vertical plane of shaft 16. Fluid storage chamber 58 is arranged around the periphery of the upper cylinders, and formed around the periphery of the remaining cylinders is the temperature control jacket space 79 having its sides formed integrally with casting 22, the bottom of which is provided with an opening covered by a removable cap 80 held in position by cap screws 81. A temperature controlling fluid such as water from the cooling system of the prime mover when an internal combustion is used, may be passed through the jacket space 79 by way of openings 79' (Fig. 2) to maintain the parts at a proper temperature.

Formed in cylinder block 22 are ports 82 (Figure 10) which terminate in the seating surface 36 of cylinder block 22 and are adapted to connect ports 34 of clutch plate 33 with the interior of the cylinders 77 respectively. Mounted for reciprocation in each cylinder 77 is a piston 83 (Figure 1) in which the cup shaped ball seating members 84 are secured by means of lock nuts 85. Threaded into the inner end of each member 84 is a check valve 85' each provided with a ball valve held in position by the spring 86. Valves 85' permit fluid under pressure to feed outward from each piston through conduits 87 formed in the ball ends 88 of piston rods 89. Ball ends 88 are secured in position against the spherical seats formed in members 84 by means of securing caps 90 threaded on the ends of members 84 and forming universal seats for the inner ball ends of the piston rods and having serrated outer surfaces 90' which engage the pistons to lock the caps against turning. Conduits 87 connect with fluid passages 91 formed in the piston rod 89 and passages 91 in turn communicate with lubricating ducts 92 formed in the outer ball ends 93 of the piston rods 89. Ball ends 93 of piston rods 89 are seated in sockets 94 secured in an oscillating ring 95, and are held in position by the cap members 96 threaded into suitable sockets formed in ring 95. Formed in oscillating member 95 (Figure 6) are cored openings 97 into which locking cotter pins 98 extend Formed in caps 96 are locking notches 99 in which the inner ends of cotter pins 98 nest. In assembly of the mechanism, caps 96 are adjusted on balls 93 to permit a universal movement of the balls in their seats without lost motion and are then locked into position by means of the cotter pins 98. If lost motion develops due to wear in the operation of the mechanism, pins 98 may be removed and caps 96 readjusted to properly seat the ball members 93.

Mounted in bores formed in oscillating ring 95 are the outer races 100 and 101 respectively of the combined radial and thrust anti-friction bearings 102 and 103. The inner race of bearing 102 is adjustably held in position on a cylindrical extension of drive member 104 by means of the threaded adjusting collar 105, and the inner race of bearing 103 is rigidly secured to drive member 104. Formed through the center of drive member 104 is a flat sided drive slot 106 in which drive section 107 of tail shaft 16 slidably fits. A pivot pin 108 serves to pivotally connect the drive member 104 to the shaft section 107 as shown in Figure 1. Formed on drive member 107 are surfaces 109 which in operation of the device limit the tilting movement of drive member 104 about pivot pin 108 in a counter-clockwise direction to a vertical position or position normal to the axis of rotation of shaft 16.

Formed integrally with oscillating ring 95 in axial alignment with pin 108 are the diametrically opposed supporting trunnions 110 (Figures 6 and 7) to which the anti-friction bearings 111 are secured by means of the lock nuts 112. Outer races 113 of bearing 111 are slidably and rotatingly mounted between guide-ways 114 of caps 115 and resist rotation of ring 95. Caps 115 are secured in suitable seats formed in casing section 73 by means of cap screws 116. It will be seen that guides 114 permit oscillation of trunnions 110 about the axis of trunnion pin 108 without permitting rotation thereof in a plane normal to the axis of shaft 16.

Figure 3:
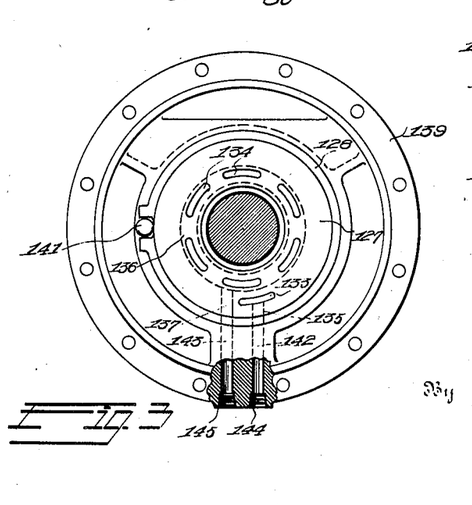
Figure 3 is a transverse sectional view taken along line III—III of Figure 1.
Figure 4:
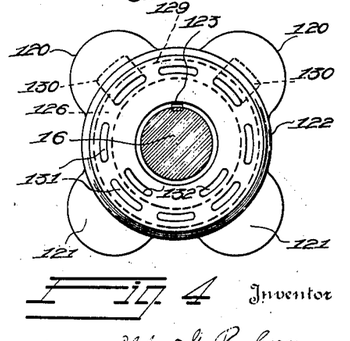
Figure 4 is a transverse sectional view taken along line IV—IV of Figure 1.

Secured to drive member 104 by ball and socket connections 117 are the outer ball ends of two pairs of oppositely disposed piston rods 118, the opposite ends of which are secured by ball and socket connections to actuating pistons 119 (Figure 1). Pistons 119 are slidably mounted in the pairs of cylinders 120 and 121 (Figures 1 and 4) which are formed on a cylinder block 122, the latter being slidably supported upon the tail shaft 16. This block 122 is slidably keyed to the tail shaft by means of key 123 so disposed that the cylinders 120 and 121 are arranged on opposite sides of pin 108. Formed in the forward end of cylinder block 122 is a recessed bore 124 in which a coil spring 125 is nested. The forward end of coil spring 125 abuts against a shoulder of tail shaft 16, and the spring is maintained under compression forcing cylinder block 122 to the right in Figure 1 holding the face 126 (Figure 4) thereof in fluid sealing engagement with the face 127 (Figure 3) of a fluid distributor 128 (Figures 1 and 3). Formed in cylinder block 122 is an annular fluid passage 129 (Figures 1 and 4) which is connected by ports 130 to the interior of cylinders 120 and is connected by an annular series of ports or openings 131 (Figure 4) to the valve face 126 of cylinder block 122. The interiors of cylinders 121 are directly connected to ports 132 which terminate in the valve face 126. Terminating in face 127 of distributor 128 (Figure 3) is a port 133 which is brought successively into communication with the annular series of ports 131 of the cylinder block 122 and an annular series of ports 134 which are successively brought into communication with the ports 132 of cylinder block 122 in operation of the device. Port 133 communicates with fluid duct 135 formed in distributor 128 and ports 134 communicate with annular fluid passage 136 formed in distributor 128 and passage 136 connects with a fluid duct 137. Ducts 135 and 137 terminate in the spherical peripheral surface 138 of distributor 128 which seats in a spherical recess formed in the casing end casting 139. Secured to casting 139 is a projection 141 (Figure 3) which extends into a suitable slot formed in distributor 128 preventing rotation but permitting a seating movement of distributor 128 on its aligning seat 138. Formed in end casting 139 with the inner ends thereof registering with ends of ducts 135 and 137 are fluid passages 142 and 143 respectively (Figure 3) through which fluid may be supplied to suitable conduits connected to the threaded pipe connections 144 and 145 respectively and controlled by a valve, not shown. The proportions and arrangement of ports 131 to 134 with respect to the area of pistons 119 and the timing faces are such that in operation the pressures are substantially balanced on the valve faces 126 and 127 so that the valve faces will be held in fluid sealing engagement without permitting excessive pressures to develop.

The rear end of tail shaft 16 is supported in suitable anti-friction bearing 146 which is held in position in casting 139 by the end cover plate 147 secured to end casting 139 by means of the cap screws 148. Splined to the end of tail shaft 16 is a coupling member 149 of a universal drive joint which is held in position on the end of the shaft by means of a lock nut 150. Surrounding a tubular extension of drive member 149 is a packing gland structure 151 which prevents loss of fluid through the case. To provide lubrication of the bearings 146, a lubricant catch pocket 153 is formed in end casting 139 and connecting the catch pocket to bearing 146 is a fluid passage 152.

*Operation*

Having described preferred arrangements of my improved transmission, the operation thereof will now be set forth. To control the multiplying and torque delivery and speed relation of the driving and driven members, the angle of inclination of the oscillating ring 95 with respect to the plane normal to the axis of rotation of tail shaft 16 is varied.

To reduce the angularity of oscillating ring 95 and the stroke of the motor pistons, a control valve (not shown) is operated and fluid under pressure is fed through pipe connection 144, conduits 142 and 135, port 133 of the distributing member 128 into the annular series of ports 131 of cylinder block 122 in any position of parts, through annular fluid passage 129 and ports 130 to the cylinders 120 forcing pistons 119 of the cylinders 120 to the left in Figure 1, causing drive member 104 and the oscillating ring 95 to tilt about pin 108 in a counter-clockwise direction in Figure 1. This movement of parts forces pistons 119 of cylinders 121 to the right in Figure 1, forcing the fluid contained therein outward through ports 132 of cylinder block 122 through the annular series of ports 134 of distributor 128, through annular passage 136, ducts 137 and 143 to the pipe connection 145. When the oscillating ring 95 and the connected parts have reached the desired inclination, the control valve is operated to lock the fluid in ducts 142 and 143 and in cylinders 120 and 121. When it is desired to shift the drive member 104 and oscillating ring 95 in a clockwise direction in Figure 1 to increase the capacity of the motor and the torque multiplying ratio so that the prime mover can properly handle the load on the tail shaft, high pressure fluid is admitted to the pipe connection 145 and the fluid from connection 144 is exhausted admitting fluid under pressure to cylinders 121 and exhausting the fluid from cylinders 120 until the desired position of parts has been reached when the fluid may again be locked in the cylinders 120 and 121 to hold the parts in fixed position.

To fill the transmission initially with fluid, oscillating ring 95 and related parts are shifted to a position inclined with relation to the vertical position as shown in Figure 1, filling plug 67 is removed, and fluid is fed into the fluid storage space 58. The fluid passes downward through ducts 57 into the central fluid storage space 51 lubricating bearings 21 and 55 and feeds through ducts 52 into space 30 and ports 29 of valve plate 28 into the suction port 26 of valve plate 23 and low pressure port 24 of the pump. After as much fluid has been filled into the circulating system as is possible in this way the prime mover is started into operation driving pump ring gear 8 which drives pinion 12 on eccentric 15 drawing fluid from port 26 through port 24 and carrying it past sealing segment 10 and forcing it under pressure outward through port 25 into the high pressure port 27 of valve plate 23. With the clutch plate 33 positioned so that the ports 34 thereof are in alignment with ports 82 of the motor cylinders 77, the fluid in port 27 will pass through the ports 34 in communication therewith into the motor cylinders 77 positioned on the proper side of the oscillating ring 95 across trunnion 108 so that the pistons 83 under pressure exert longitudinal thrusts on the piston rods 89 and oscillating ring 95 which is transmitted through the bearings 102 and 103 to the drive member 104 causing a resultant force tending to rotate drive member 104. Drive member 104 rotates tail shaft 16 in the direction of rotation of the driving coupling 4 and exerts a longitudinal thrust on shaft 16 which is transmitted through thrust member 18 to the pump side wall 14 holding the pump and valve faces in fluid sealing engagement with a predetermined pressure in excess of the total fluid pressures tending to separate the valve faces, holding the parts in sealing engagement while permitting expansion and contraction in operation.

In addition to the driving force applied to the tail shaft by the motor the reaction due to pumping is transmitted through eccentric 13 and quill 15 to tail shaft 16. Shaft 16 will then rotate at a speed with relation to the speed of driving member 4 that will depend upon the volumetric capacity of the motor per revolution of shaft 16 in well known manner. As shaft 16 rotates, valve 23 will be driven thereby and the admission of fluid to the cylinders 77 will be so timed as to maintain reciprocation of the pistons 83, oscillation of ring 95 and rotation of shaft 16. The relation of parts is such that while pistons 83 are moving to the right in Figure 1, their respective cylinders will be in communication with high pressure port 27, while when the pistons are moving to the left in Figure 1, their respective cylinders will be in communication with the suction port 26. On the inward stroke of the pistons, the fluid together with any air that may be contained in the cylinders will be forced through ports 26 and as the valve 23 rotates with the tail shaft, fluid will pass from chamber 30 under the influence of centrifugal force through ducts 29 into port 26 while air entrained in the circulating fluid will pass outward through ducts 29, and will pass through the openings 52 into the storage chamber 51 from which it will rise upward through the passages 57 and will pass out through the check valve 64 into space 66 and then to atmosphere. As the operation continues the air entrained in the fluid circulating system will be rapidly replaced by fluid and after the air has been eliminated the filling is continued until the fluid overflows through the check valve 64 into the lubricating conduits 69 and 70. After the circulating system has been filled with fluid the plug 67 may be replaced and the operation may be continued while oil is fed to the circulating pump of the mechanism, or into the crank case of the engine in the usual manner, if the mechanism is connected to the oil pump and crank case of the engine. Fluid is then pumped through pipe connection 62 into the storage space 58 and the filling of the oil into the engine crank case continued until the proper crank case oil level is maintained continuously indicating that the fluid storage chambers of the transmission have been filled with fluid and that the fluid is overflowing into the conduits 69, 70 and 71 dropping into the path of oscillating ring 95 from where part is thrown into the lubricating recess 153 for lubricating the bearing 146 and the remainder passes downward into bearings 103 and 102 and over the oscillating ring motor drive parts lubricating the parts and collects in casing section 73 then passing through ducts 75 in cylinder blocks 22 into casing section 46 and back through the connection 50 into the engine crank case or to the circulating pump.

As fluid pressure is applied to each piston 83 the ball in check valve 85' will unseat and a small quantity of fluid will pass outward under pressure through the lubricating duct 87 into the passages 91 and ducts 92 lubricating the ball seats and ball ends 88 and 93 of piston rods 89. During the inward or return stroke of the motor pistons the balls in the check valves 85 will seat under the influence of their springs 86 preventing the entry of any substantial amount of air through the lubricating passages or the ball ends of the piston rods. It will be seen that when the mechanism is filled with fluid all of the operating parts are properly lubricated and any air entrained in the fluid during power transmitting operations will pass out of the circulating system through ducts 29 without causing formation of emulsion and the mechanism is operative for power transmitting purposes.

To establish a neutral condition in the mechanism so that the driving connection 4 and pump gears may be driven without driving the tail shaft, fluid under pressure is admitted to the upper clutch operating cylinder 43 (Figure 10) and exhausted from the lower cylinder 43 through fluid connections 45 operating pistons 41 to rotate the clutch plate 33 on its seating surface 35 until ports 34 of clutch plate 33 interconnect motor cylinder ports 82. In this position of parts, a circulating path for the fluid will be established between the ports 26 and 27 of the valve 23, independently of the motor cylinders, preventing the building up of sufficient pressures by the action of the pump to produce rotation of the tail shaft 16 against a substantial resistance.

In a motor vehicle, the driving wheels frequently drive the tail shaft, as for example, during deceleration periods. Under these conditions the drive shaft will tend to speed ahead of the engine rotating eccentric 13 and segment 10 which actuates pinion 12 and the pump parts reversing the pumping action and drawing fluid from the high pressure port 27, forcing it into the low pressure port 26, and out through the port 29 into the tank 51. This causes a surge of fluid through ducts 52 into the fluid storage space 51 and ducts 57 into the space 58 which closes the check valve 64 and the fluid is then confined under pressure in the fluid storage spaces. This action removes the resistance to rotation of the driving shaft momentarily and the engine will speed up following the tail shaft rotation until it again meets resistance and drives the tail shaft 16. In this way a flexible driving connection is maintained between the driving member and the driven shaft which will absorb shocks due to sudden deceleration and will cushion the drive improving the riding qualities and operation of the vehicle as a whole.

When it is desired to utilize the mechanism for rapid deceleration for braking purposes, ring 95 is set at an angle which will give the desired torque ratio and braking effect. With the parts in this position, as the wheels drive the tail shaft the motor unit will function as a pump, fluid pressures will be built up on the suction side of the system, and in the fluid storage space closing check valve 64 and fluid will be forced under pressure into the pump unit causing the pump to function as a motor tending to speed the engine ahead of the tail shaft at a rate depending upon the inclination of ring 95. In this way it will be seen that the compression of the engine may be utilized for braking purposes.

It will be understood by those skilled in the art, that preferred embodiments only of the invention are disclosed and that wide variations therein may be made without departing from the spirit of my invention, as defined by the scope of the appended claims. Accordingly, what is desired to be secured by Letters Patent and claimed as new is:

1. A fluid operated transmission comprising driving and driven members; a fluid pump actuated by the difference in rotation of said driving and driven members; a motor driving said driven member and actuated by fluid delivered thereto by said pump; a fluid supply storage space surrounding said driven member and normally connected to the suction side of said pump; and stationary means forming a part of said motor and supporting a normally open check valve for establishing communication between said storage space and the atmosphere.

2. A hydraulic transmission comprising a driving member; a driven member; a gear pump actuated to pump fluid by the difference in rotation of said driving and said driven member; fluid timing means for said pump actuately solely by said driven member; a plurality of relatively stationary motor cylinders receiving fluid from said distributing means; a plurality of fluid actuated pistons mounted for reciprocation in said motor cylinders; driving connections between said driven member and said pistons; and means for varying the stroke of said pistons.

3. In a hydraulic transmission, a driving member; a driven member; a hydraulic motor driving said driven member; and a hydraulic gear pump comprising parts tending to separate under the action of fluid pressures in operation and actuated by the difference in rotation of said driving and said driven members adapted to deliver fluid under pressure to said hydraulic motor; and means actuated by the fluid pressures developed in said pump to hold said parts in operative relation against the fluid pressures developed therein.

4. In a hydraulic transmission, a driving member; a driven member; a pump comprising a pair of relatively separable side walls, a gear actuated by said driving member and a gear actuated by said driven member; a motor actuated by fluid delivered thereto by said pump driving said driven member; and means operated by the fluid pressures developed in said pump for holding the parts of said pump in operative relation.

5. In a hydraulic transmission, a driving member; a driven member; a fluid motor actuating said driven member; a gear pump comprising parts separable under pressure adapted to deliver fluid under pressure to said motor actuated by said driving and said driven members; and means for holding said pump parts in operative pumping relation by driving reactions of said motor.

6. A hydraulic transmission comprising a driving member; a driven member; supporting means for said members; a gear pump actuated by said driving and said driven members; and a fluid motor actuating said driven member operated by fluid delivered thereto by said pump, and means interconnecting said pump and motor so that the reactions of said motor and said pump are balanced in operation and only torsional reactions are transmitted to said supporting means during power transmitting operations.

7. A torque multiplying hydraulic transmission comprising driving and driven members; a fluid motor driving said driven members including non-rotatable cylinders; a fluid pump comprising a ring gear actuated by said driving member, a pinion supported on said driven member; and fluid distributing means actuated solely by said driven member and interposed between said pump and said motor.

8. A torque multiplying hydraulic transmission comprising a driving member; a driven member; an eccentric rotatable with said driven member; a pinion journaled on said eccentric; a ring gear concentric with said driven member meshing with said pinion and driven by said driving member; a sealing segment interposed between said pinion and said ring gear; pump side walls rotatable with said driven member, one of said side walls being ported to distribute fluid through said pump; and a motor, actuated by fluid delivered thereto by said pump, driving said driven member.

9. The sub-combination of a driving member; a driven member; means for controlling the relative rate of rotation of said members; a pump comprising an eccentric rotatable with said driven member; a ring gear concentric with said driven member and driven by said driving member; a pinion meshing with said ring gear and journaled on said eccentric; pump side walls rotatable with said driven member; and a valve associated with one of said side walls, said valve and said one side wall being ported to distribute fluid through said pump.

10. In a hydraulic transmission, a driving member; a driven member; a pump actuated by the difference in rotation of said driving and said driven members; fluid distributing means rotatable with said driven member timing said pump; a variable capacity motor driving said driven member comprising a plurality of stationary cylinders receiving fluid from said distributing means; and a fluid storage space surrounded by said cylinders connected to the suction side of said pump and normally open to atmosphere.

11. A hydraulic transmission comprising a driving member; a driven member; a fluid pump actuated by the difference in rotation of said driving and said driven members; a motor driving said driven member; fluid distributing means interposed between said motor and said pump; a fluid storage space normally connected to atmosphere; an open connection between the suction side of said pump and said fluid storage space; and means for checking the flow of fluid from said fluid storage space when pressures develop therein in operation of the mechanism.

12. In a hydraulic transmission, driving means; driven means; a rotary pump actuated by said driving means with the parts thereof mounted upon said driven means in a manner to permit relative separational movement; resilient and fluid pressure operated means for operating through said driven means to resist the separating movement of said pump parts in operation of the transmission; and a fluid motor actuated by fluid delivered thereto by said pump driving said driven means.

13. In a hydraulic transmission, the sub-combination of a driving member; a driven member; a pump actuated by the difference in rotation of said driving and said driven members comprising substantially parallel side wall members mounted in a manner permitting relative separating movement; and means actuating said driven member to urge one of said wall members towards the other in operation of the transmission.

14. The subcombination as set forth in claim 13 in which said last mentioned means utilizes fluid pressures developed by said pump for resisting separating movement of said side wall members.

15. The sub-combination as set forth in claim 13 in which said last mentioned means utilizes spring pressures and fluid pressures to resist separating movement of said side wall.

16. A hydraulic transmission comprising driving means; driven means; a rotary gear pump actuated by said driving and said driven means and having side wall members held in substantial fluid sealing relationship by said driven means; a fluid motor embodying separable portions one of which drives said driven means; fluid receiving and distributing means interposed between said pump and said motor; said driving portion of the motor reacting against said driven means to maintain said receiving and distributing means, by fluid pressures developed during power transmitting operations, in sealing engagement with said pump and said motor.

17. A hydraulic transmission comprising driving means; driven means; a gear pump embodying separably mounted parts actuated by the difference in rotation between said driving and said driven means; a stationary fluid receiving and distributing means comprising high and low pressure fluid chambers through which fluid is circulated by said pump; and a motor embodying a plurality of parts driving said driven means actuated by fluid circulated therethrough from said stationary distributing means; said pump parts being held in substantial fluid sealing and assembled relation with respect to each other and said fluid receiving and distributing means by fluid pressure reactions acting through said driven means during power transmitting operations.

18. The combination as set forth in claim 17 together with resilient means acting on said driven means to initially hold said motor and pump parts together and in substantial fluid sealing relationship with respect to said stationary receiving and distributing means when no fluid pressures are developed.

19. The combination as set forth in claim 17 in which said motor comprises a plurality of stationary recesses receiving reciprocating elements for imparting rotation to said driven means.

20. A hydraulic transmission comprising driving means; driven means; a pump assembly actuated by said driven means embodying a pair of meshing gears and a pair of pump side wall members, one of said side wall members having a substantially flat ported face; fluid receiving and distributing means having a substantially flat ported face against which said pump assembly is held by fluid pressures developed in operation of the mechanism; and a fluid motor actuated by fluid delivered thereto by said pump driving said driven means.

21. The combination as set forth in claim 20 in which said pump is actuated to pump fluid by the difference in rotation of said driving and said driven means.

22. The combination as set forth in claim 20 in which said pump assembly is held in operative position by said driven means.

23. A hydraulic transmission comprising driving means; driven means; a pump assembly actuated by the difference in rotation of said driving and said driven means and embodying a substantially flat timing face; stationary fluid receiving means provided with a co-acting substantially flat face against which said pump face is held in operation of the mechanism; a fluid motor driving said driven means receiving operating fluid from said stationary means; and means responsive to fluid pressures adapted to exert an end thrust on said driven means to hold said pump assembly in operative position.

24. The combination as set forth in claim 23 in which said last mentioned means utilize endwise thrusts developed by the operation of said motor.

25. A hydraulic transmission comprising a driving member; a driven shaft; a fluid pump actuated by the difference in rotation of said driving member and said driven shaft; stationary fluid receiving means in which said shaft is journaled and with which said pump is held in fluid circulating relationship by said shaft; a fluid motor actuated by fluid circulated through said stationary means driving said driven shaft.

26. The combination as set forth in claim 25 in which said shaft holds said pump in operative position due to end thrust applied thereto in said fluid circulating relationship by fluid pressures developed by said pump.

27. The combination as set forth in claim 25 in which reactions from said motor are transmitted through said shaft to said pump to hold said pump in said fluid circulating relationship.

28. A hydraulic transmission comprising driving means; driven means; a pump actuated by the difference in rotation of said driving and said driven means; stationary fluid receiving and distributing means provided with low and high pressure passages through which fluid is circulated by said pump; a ported clutch valve provided with a substantially flat timing face adapted to interconnect said low and high pressure passages; a hydraulic motor driving said driven means receiving operating fluid through said passages in power transmitting operation; and means for yieldingly holding said pump and valve in operative position with relation to said fluid receiving and distributing means.

29. The combination as set forth in claim 28 in which said last mentioned means is responsive to fluid pressures.

30. The combination as set forth in claim 28 in which said last mentioned means comprises a resilient element.

31. The combination as set forth in claim 28 in which said last mentioned means comprises resilient and fluid pressure operated elements.

32. The combination as set forth in claim 28 in which said clutch valve is positioned between said pump and said fluid receiving and distributing means.

33. In combination, a driving member; a driven member; a pair of pump side wall members driven by said driven member; pump gears interposed between said side wall members one of which is rotatable with said driving member and the other of which is rotatable with said driven member; a motor driving said driven member actuated by fluid delivered thereto by said pump; and means acting through said driven member to hold said pump side walls and gears in fluid sealing relationship.

34. In combination with the fly-wheel of an engine; a hydraulic torque multiplying transmission comprising a driving member secured to said fly-wheel; a driven member piloted in said fly-wheel; a gear pump actuated by the difference in rotation of said driving and driven members; and a motor actuated by fluid pressures delivered thereto by said pump driving said driven member.

35. In combination with a rotatable fly-wheel, a hydraulic transmission comprising a driving member driven by said fly-wheel; a driven member piloted in said fly-wheel; a pump comprising a pair of side walls with meshing pump gears disposed between them, said pump being actuated by the difference in rotation of said driving and said driven members; and a motor driven by fluid delivered thereto by said pump.

36. The combination as set forth in claim 35 in which said pump gears comprise a ring gear concentric with and driven by said driving member, and a pinion eccentrically journaled on said driven member.

37. A hydraulic transmission comprising driving means; a fluid pump actuated by said driving means; driven means; a fluid motor driving said driven means; connecting high and low pressure fluid conduits between said pump and motor; a storage reservoir adapted to feed fluid to said pump, motor, and conduits by gravity; a casing section adapted to receive fluid leakage from said pump; another casing section adapted to receive fluid leakage from said motor; means permitting removal of the excess leakage from one of said casing sections; and means establishing communication between said casing sections.

38. A hydraulic transmission comprising a driving member; a driven member; a pump actuated by the difference in rotation of said driving and said driven members; stationary fluid receiving and distributing means provided with high and low pressure fluid passages through which fluid is circulated by said pump; a motor driving said driven member through which fluid is circulated from said passages; separate casing sections surrounding said pump and motor adapted to retain leakage fluid; a stationary gravity feed tank feeding fluid into said passages by gravity; and means permitting withdrawal of the fluid from said casing sections.

39. A hydraulic transmission comprising driving means; driven means; a pump actuated by the difference in rotation of said driving and said driven means; stationary fluid receiving and distributing means provided with low and high pressure fluid chambers through which fluid is circulated by said pump; a motor driving said driven means through which fluid is circulated from said chambers; and means including said driven means for yieldingly holding said pump in fluid sealing relationship with said stationary fluid receiving and distributing means.

40. In a hydraulic transmission, a driving member; a driven member; a fluid pump actuated by the difference in rotation of said members; a fluid motor actuated by fluid delivered thereto by said pump driving said driven member; stationary fluid receiving and distributing means interposed between said pump and motor through which said driven member extends; and means for yieldingly applying pressure on said pump through said driven member in a direction to urge said pump toward said stationary means to seal the pump against fluid leakage.

41. The combination as set forth in claim 40 in which said stationary means is provided with a fluid storage chamber and a space through which a cooling medium may be circulated.

42. The combination as set forth in claim 40 in which said motor comprises a plurality of stationary cylinders.

43. The combination as set forth in claim 40 in which said stationary means is supplied with an extension adapted to be secured to the bell housing of a prime mover, together with a casing section for said motor detachably secured to said stationary means.

44. In a hydraulic transmission; stationary fluid receiving and distributing means provided with a central low pressure fluid chamber and a high pressure chamber outside of said low pressure chamber; a driving member and a pump driven thereby to circulate fluid through said chambers; a driven member journaled in and extending through said stationary means; yielding means exerting endwise pressure on said pump through said driven member; and a motor through which fluid is circulated from said chambers driving said driven member.

45. The combination as set forth in claim 44 in which said low pressure chamber is provided with an annular and unobstructed space.

46. The combination as set forth in claim 44 in which said pump utilizes a centrifugal pumping action.

47. The combination as set forth in claim 44 in which said pump is a gear pump the low pressure side of which is fed by centrifugal action.

48. A hydraulic transmission comprising a fluid circulating system embodying a pump, a fluid motor, and interconnecting fluid passages between said pump and said motor; yielding means interconnecting said pump and said motor operable to hold the same in fluid circulating relationship during power transmitting operation; encasing means adapted to receive fluid leakage from said system; means permitting the removal of the excess leakage from said encasing means; a gravity storage tank for supplying fluid to said circulating system; and means for maintaining a constant level in said storage tank.

In testimony whereof I affix my signature.
ALDEN G. RAYBURN.